Patented May 28, 1946

2,401,266

UNITED STATES PATENT OFFICE 2,401,266

ELECTRIC INSULATING MATERIAL

Archibald Alan New, London, England, assignor to International Standard Electric Corporation, New York, N. Y.

No Drawing. Application December 17, 1941, Serial No. 423,315. In Great Britain January 2, 1941

1 Claim. (Cl. 260—42)

This invention relates to electric insulating materials.

According to the present invention an electric insulating material is provided comprising a mixture of polymerised styrene and polymerised alpha-methyl styrene that is solid or semi-solid at ordinary temperatures but is sufficiently soft at a temperature not exceeding 120° C. to be extruded under hand pressure.

The particular proportions to be used depend upon the molecular weight of the polystyrene but more particularly upon the viscosity of the polymerised alpha-methyl styrene. The latter substance exists in a wide range of viscosities. It is sold commercially under the designations "Polymeth 375" (which was formerly designated "Polymeth 2"), and "Polymeth 250" (which was formerly designated "Polymeth 3"). The former has a viscosity of approximately 2000 centistokes at 100° F., and the latter of approximately 100 centistokes at 100° F. The proportions to be used according to the invention are 50% to 80% by weight of polymerised alpha-methyl styrene of the higher viscosity referred to above with 50% to 20% of polystyrene of molecular weight 80,000, or 46% to 70% of the lower viscosity polymerised alpha-methyl styrene mentioned above with 54% to 30% of polystyrene of molecular weight 80,000  It is apparent from the above that 50% to 70% by weight of the polymerized alpha-methyl styrene of a viscosity from 100 to 2,000 centistokes at 100° F. may be employed with 50% to 30% of polystyrene of molecular weight 80,000.

The following table gives the consistency at room temperature of compositions according to the invention. The consistency is expressed by the number of units (hundredths of a centimetre) penetrated by a standard Institute of Petroleum Technologists' needle in 5 seconds under a load of 100 grams, the sample tested having remained at the temperature of test for at least 1 hour prior to the test.

Table 1

| | Polystyrene molecular wt. 80,000 | Polymerised alpha-methyl styrene | | Penetration at 25° C. |
|---|---|---|---|---|
| | | | | Units |
| 1 | 50 | Viscosity 2000 centistokes at 100° F. | 50 | 8 |
| 2 | 45 | | 55 | 12 |
| 3 | 40 | | 60 | 36 |
| 4 | 30 | | 70 | 54 |
| 5 | 20 | | 80 | 160 |
| 6 | 54 | Viscosity 100 centistokes at 100° F. | 46 | 29 |
| 7 | 50 | | 50 | 43 |
| 8 | 45 | | 55 | 56 |
| 9 | 40 | | 60 | 80 |
| 10 | 35 | | 65 | 140 |

All the above compositions can be extruded easily under hand pressure at 120° C.

If the polystyrene is of a molecular weight different from 80,000 the relative proportions required to give a composition of a particular consistency must be slightly varied. As an example of the variations that should be made the following are the percentage compositions of mixtures giving a penetration of 12 units when tested as above described.

Table 2

| Molecular weight of polystyrene | Percentage composition | |
|---|---|---|
| | Polystyrene | Polymeth 375 |
| 73,000–79,000 | 45.9 | 54.1 |
| 79,000–89,000 | 45.0 | 55.0 |
| 89,000–100,000 | 44.1 | 55.9 |
| 100,000–110,000 | 43.1 | 56.9 |
| 110,000–121,000 | 42.5 | 57.5 |
| 121,000–143,000 | 42.0 | 58.0 |

The above molecular weights were determined by the method of Staudinger making viscosity measurements on dilute solutions of polystyrene.

The polymerised alpha-methyl styrene of the lower of the two viscosities mentioned, appears to contain a moderately volatile constituent which has a detectable effect on its plasticising qualities and of which there is an appreciable loss at high temperatures. On this account mixtures show in practice lower penetration values than those quoted in the table given above (which were obtained in sealed tubes). Moreover this volatile constituent has a pungent smell and causes the eyes to smart. It is accordingly preferred to use the polymerised alpha-methyl styrene of higher viscosity.

The compositions according to this invention are very suitable for filling spaces associated with electrical apparatus as they are readily extruded and possess satisfactorily low power factors over wide ranges of frequencies and temperatures.

For example, the mixture No. 2 in Table 1 given above is a stiff semi-solid at ordinary temperatures but is easily extruded through a small nozzle under hand pressure at 100° C. Mixture No. 9 in Table 1 is a soft semi-solid just extrudable by hand at ordinary temperatures. It is very suitable for filling enclosed joints, particularly in high frequency lines, by the method described in British Patent No. 359,400.

Compositions according to this invention may be made in a variety of ways, but if they are to be subject to considerable electrical stress it is important that they should be free from occluded air or gases. Mixtures may be made by dissolving the required quantities in a common solvent such as benzene or trichlorethylene and evaporating the solvent. The shorter methods given below are, however, preferred.

*Method 1.*—Polymerised alpha-methyl styrene is poured straight into a dough mixing machine capable of being heated, the heating system set into operation and the blades started revolving. Finely divided polystyrene is added while the dough mixer is warming up. The dough mixer is continued in operation until complete incorporation has taken place. The time required varies with the temperature; at 95° C. about 8 hours are required but at 110° C. three hours have been found sufficient. The mixture is then poured from the dough mixer into a container and heated for a further period to cause the air bubbles therein to swell and coalesce and drive them off. A heating for 24 hours at 100° C. followed by a subjection to low pressure (1 cm. of mercury) for a further 24 hours or a heating under the above mentioned low pressure at 140° C. for 10 hours has been found sufficient.

*Method 2.*—Polymerised alpha-methyl styrene is poured into a mixing cylinder fitted with a stirrer and capable of being heated. Heat is applied and the stirrer put into operation. When the temperature has reached 50°–60° C. the polystyrene in finely divided state is gradually added during a period of 2 to 3 hours. The temperature is then raised to 170°–180° C. and held at that temperature, stirring being continued until thorough mixture has taken place. The time required is dependent upon the molecular weight of the polystyrene and varies from 8 to 12 hours. The mixture is then run into the canisters from which it is finally to be used, such as canisters to be used with the extruding apparatus described in British Patent No. 542,694. These canisters must be clean and the mixture is preferably run down the inside surface of the canister to avoid the inclusion of air bubbles. The canisters are placed in an oven kept at a temperature between 120°–140° C. for a period of 10 to 20 hours. The canisters are then allowed to cool to room temperature.

The canisters containing a mixture prepared according to either of the two above mentioned methods are preferably completely filled and then sealed to exclude air by warming the upper surface of the mixture, inserting a lead sealing washer by pressure into the top and securing a cover in position over the washer, as for example by soldering.

What is claimed is:

A low power factor electrical insulating composition, solid at ordinary atmospheric temperature and readily extrudable by manual pressure at 120° C., that comprises a mixture of polymerized styrene having a molecular weight of about 80,000 and polymerized alpha methyl styrene having a viscosity of between about 100 and 2,000 centistokes at 100° F., the proportions being about 50% to 30% of the former to about 50 to 70% of the latter, based upon weight of the mixture.

ARCHIBALD ALAN NEW.